(12) United States Patent
Henry

(10) Patent No.: US 11,084,137 B1
(45) Date of Patent: Aug. 10, 2021

(54) ROUTER SLED

(71) Applicant: Michael F. Henry, Broken Arrow, OK (US)

(72) Inventor: Michael F. Henry, Broken Arrow, OK (US)

( * ) Notice: Subject to any disclaimer, the term of this patent is extended or adjusted under 35 U.S.C. 154(b) by 188 days.

(21) Appl. No.: 16/392,201

(22) Filed: Apr. 23, 2019

(51) Int. Cl.
*B27C 5/10* (2006.01)
*B23Q 9/00* (2006.01)
*B23Q 16/00* (2006.01)

(52) U.S. Cl.
CPC ......... *B23Q 9/0028* (2013.01); *B23Q 16/001* (2013.01); *B27C 5/10* (2013.01)

(58) Field of Classification Search
CPC .... B27C 5/00; B27C 5/02; B27C 5/10; B27C 9/005; B27C 9/02; B27F 1/02; B27F 1/04; B27F 1/06; B27F 1/08; B27F 1/10; B27F 1/12; B27F 1/16; B27F 5/00; B27F 5/02; B23Q 9/0014; B23Q 9/0064; B23Q 9/0028; B23Q 9/0035; B23Q 9/0071; B23Q 5/34; B23Q 2705/104; B23Q 2705/16; B23Q 2705/165; Y10T 409/30784; Y10T 409/307896; Y10T 409/307952; B23C 1/06; B23C 1/20
See application file for complete search history.

(56) References Cited

U.S. PATENT DOCUMENTS

| | | | | |
|---|---|---|---|---|
| 4,516,453 A | * | 5/1985 | Parham, Jr. | B23D 59/007 83/471.3 |
| 4,735,531 A | * | 4/1988 | Boerckel | B23Q 1/621 144/136.95 |
| 4,738,571 A | * | 4/1988 | Olson | B23Q 11/0046 408/67 |
| 5,203,389 A | * | 4/1993 | Goodwin | B27C 9/005 144/134.1 |
| 5,273,090 A | * | 12/1993 | Klemma | B23Q 9/0085 144/134.1 |
| 9,174,286 B1 | * | 11/2015 | Smith | B23P 6/00 |
| 10,143,302 B2 | * | 12/2018 | Fink | B27C 1/005 |
| 10,160,079 B2 | * | 12/2018 | Ashworth | B23Q 9/0042 |

* cited by examiner

*Primary Examiner* — Matthew Katcoff
(74) *Attorney, Agent, or Firm* — GableGotwals

(57) ABSTRACT

A sled for guiding a common hand router to cut a precision planar surface on a workpiece has plywood frame rails spaced by cradles supporting the workpiece between the frame rails. Base rails riding on the upper edge surfaces of the plywood frame rails are sequentially incrementally advanced at intervals along the frame rails in an X-axis direction by a linear ratchet assembly. A router is reciprocated in Y-axis directions during the intervals between the sequential incremental advances of the base rails, cutting a precision planar surface on the workpiece. The router is adapted to adjust the Z-axis elevation of the router cutter. The sled may be manually operated or automated.

7 Claims, 6 Drawing Sheets

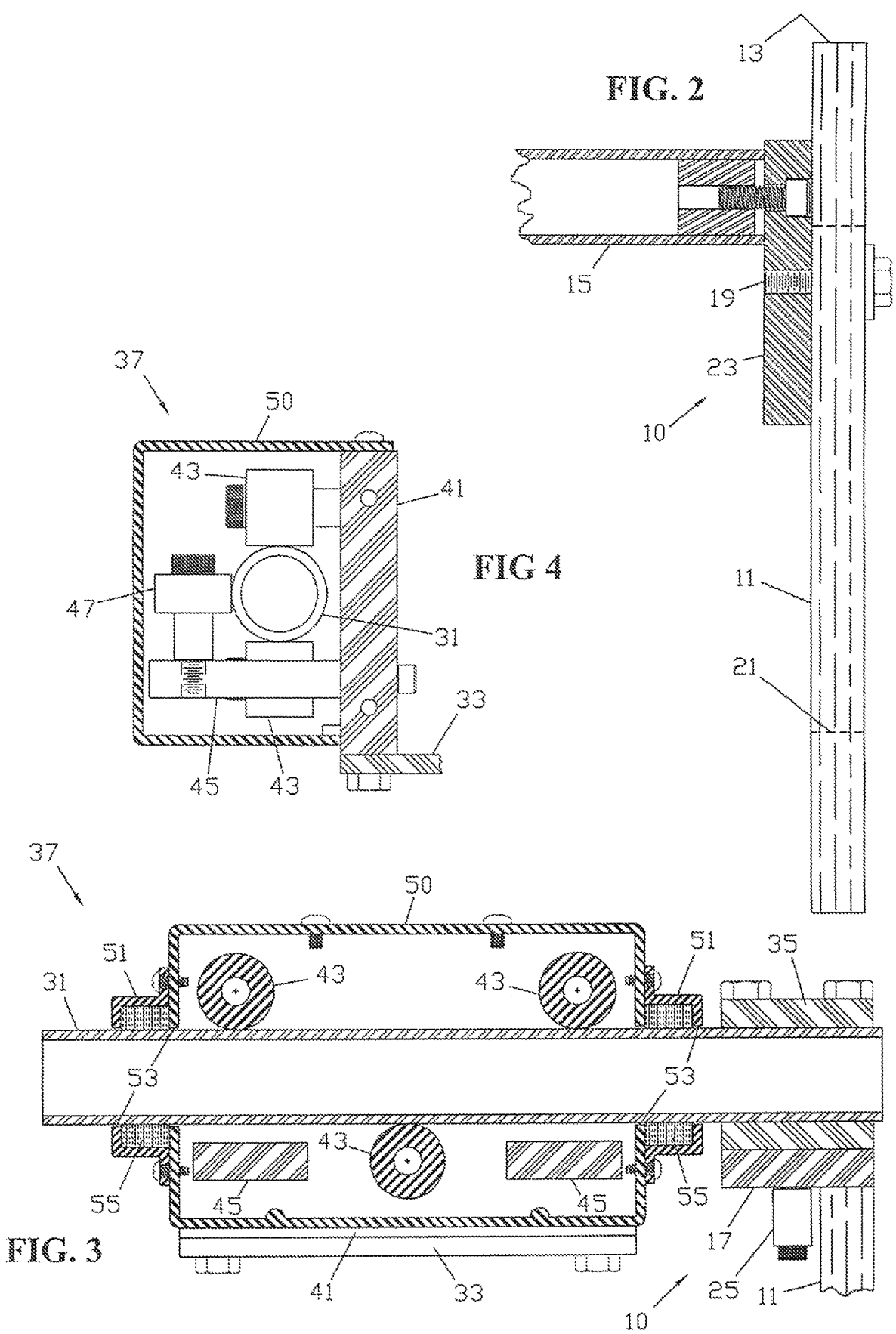

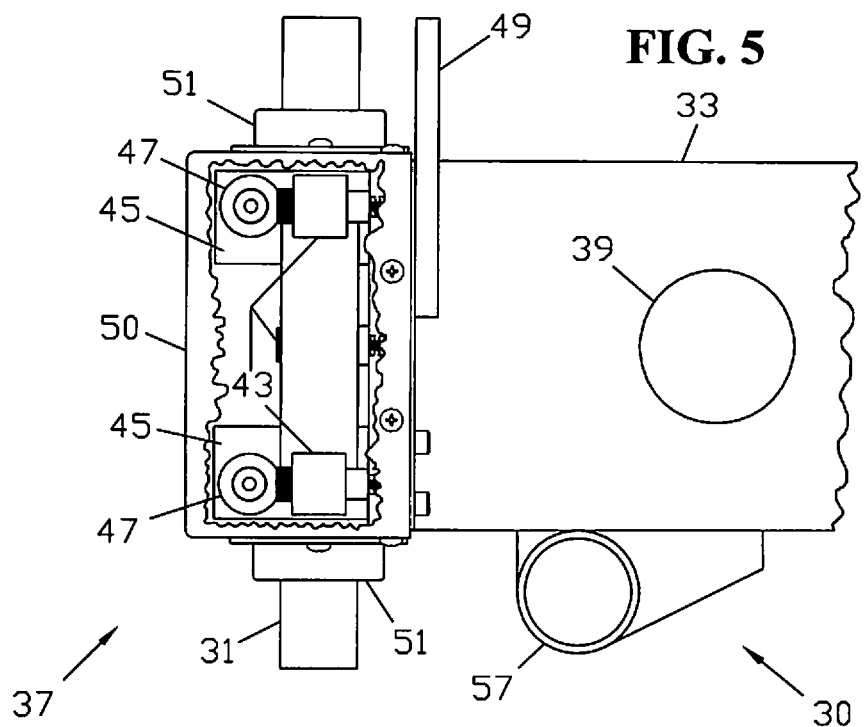
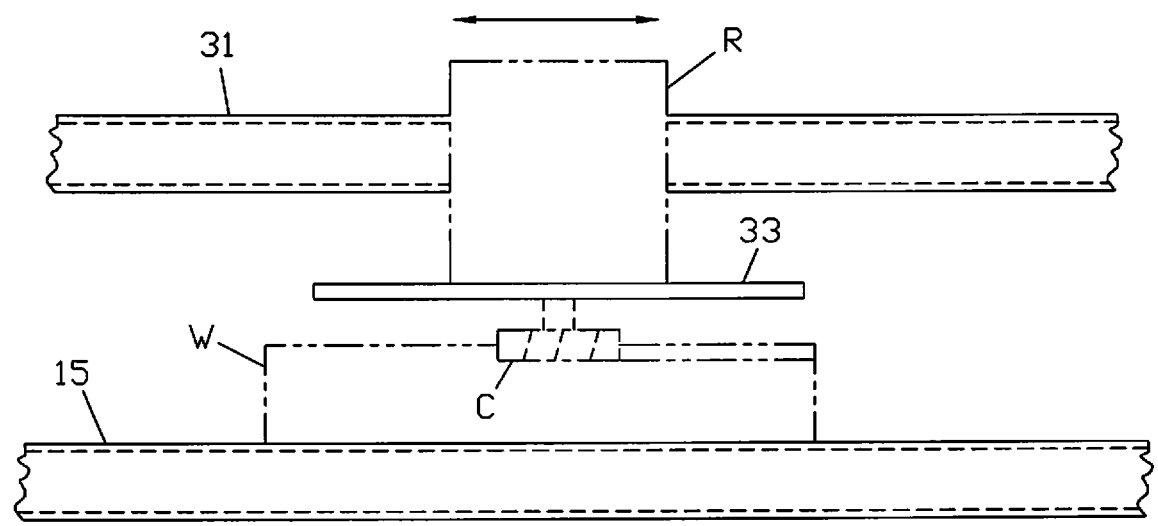

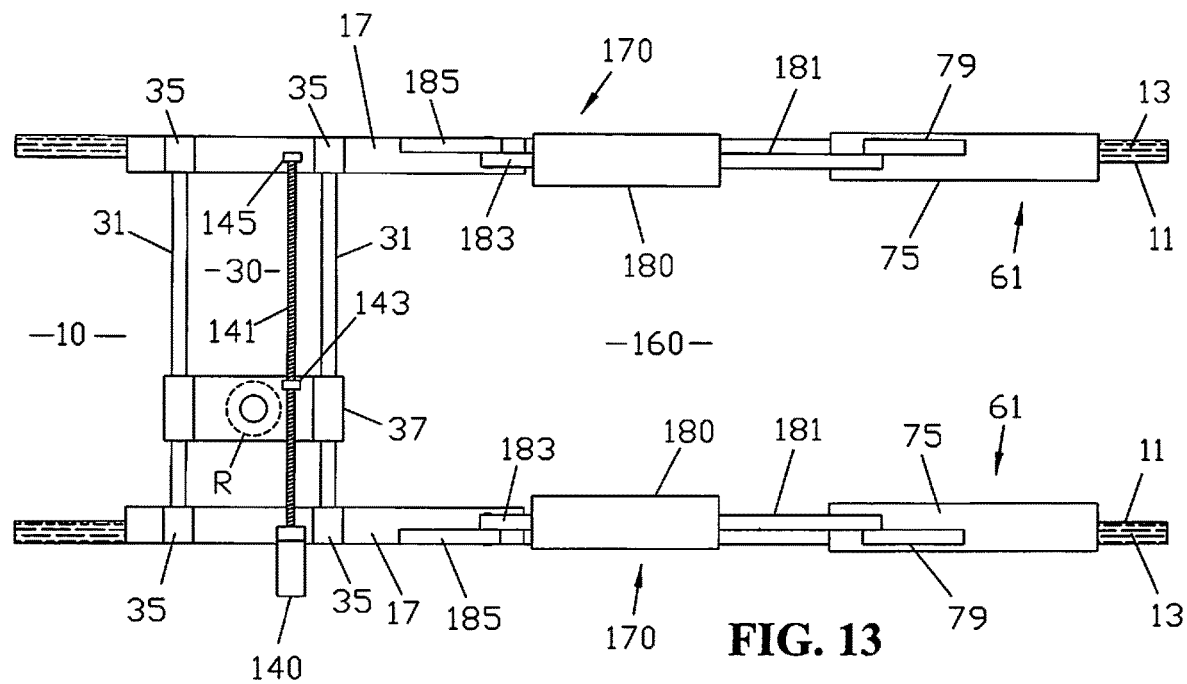
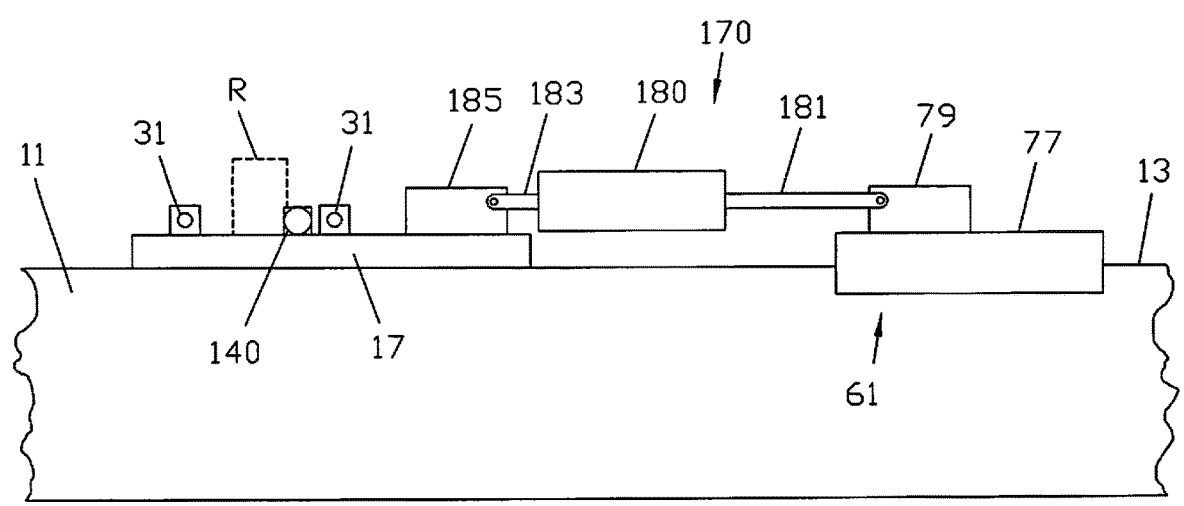
FIG. 13
FIG. 14

ROUTER SLED

BACKGROUND OF THE INVENTION

This invention relates generally to woodworking and more particularly concerns a tool enabling a common hand router to cut a planar surface on a hardwood slab.

Fine hardwood furniture is beautiful, durable and prohibitively priced for many budgets. Among the significant contributors are the cost of the tools and labor needed to surface the hardwood to fine furniture standards. Historically, creating planar surfaces on large slabs of wood has been a problem with less than ideal solutions.

One option has been to use a conventional planer, but conventional planers that can accommodate very wide slabs are very rare and very expensive. They are also incapable of producing a flat surface on a twisted or warped work piece. If the piece to be planed is twisted, the piece will still be twisted after it has been planed by a conventional planer.

Another option has been to use a more modern computer-controlled router. Unfortunately, computer-controlled routers tend to be large and very expensive and, therefore, generally impractical for individual or small shop operators. For all their size and cost, they are usually useful only with workpieces up to about 48 inches in width and 96 inches in length.

A further option is the use of a known sled. However, in order to move the router in a transverse direction, they typically use friction-bearing router guidance systems that open the door to variable friction and, therefore, to inconsistent cutting and operator fatigue. They have no propulsion system for moving in a longitudinal direction, so the operator must bump the apparatus by hand to index for the next cut, resulting in wasted time and effort and inconsistent cuts.

Furthermore, most linear guidance systems applicable to motion in a longitudinal direction use either friction or anti-friction linear bearings riding on metal rails or shafts. Friction-type linear bearings typically utilize a bearing surface of low friction plastic such as PTFE, or UHMW and anti-friction linear bearings have a system of re-circulating balls. Such systems require their rails to be precise in cross-section and straightness and to be precisely aligned. They require precision set-up and alignment or compensation in design to allow for deviations in geometry. Typical construction includes extruded aluminum, hardened and ground round shafts, or hardened and ground rails of other geometries. All of these systems are expensive.

Most, if not many, of these existing options do not provide for collection of the large volume of dust and chips generated during operation of the system. The continued presence of this process debris can result in operator stress and fatigue, inaccuracies in the finished work product and inefficiency and ultimately downtime in the use of the system.

It is, therefore, an object of this invention to provide a cost-effective tool for surfacing hardwood to fine furniture standards. Another object of this invention is to provide a cost-effective tool for converting a common hand router into a fine furniture planar facer. A further object of this invention is to provide a tool operable by a single craftsman to surface hardwood to fine furniture standards. Yet another object of this invention is to provide a tool for converting a common hand router into a fine furniture planar facer having no practical workpiece length or width limitations. Still another object of this invention is to provide a tool for converting a common hand router into a fine furniture planar facer that can be adjusted without having to re-build the entire machine. It is also an object of this invention to provide a tool for converting a common hand router to a fine furniture planar facer that minimizes variable-friction facing issues. An additional object of this invention to provide a tool for converting a common hand router to a fine furniture planar facer with a propulsion system that reduces time and effort and maximizes cutting efficiency. And it is an object of this invention to provide a tool for converting a common hand router to a fine furniture planar facer that facilitates collection of the large volume of dust and chips generated during operation.

SUMMARY OF THE INVENTION

In accordance with the invention, a sled is provided for guiding a common hand router to cut a precision planar surface on a workpiece. The sled has two parallel frame rails, preferably of plywood, with upper edge surfaces defining a common horizontal plane. Two cradles space the parallel frame rails at a distance suitable to support the workpiece on the cradles and between the frame rails. Two parallel base rails slide on the upper edge surfaces of their corresponding frame rails. A linear ratchet assembly upstream of the base rails sequentially incrementally advances the base rails downstream at intervals along the frame rails. Two parallel shafts are orthogonally aligned in relation to and span between the base rails. A router base plate mounted to slide on the shafts and above the workpiece is reciprocated on the shafts during the intervals between incremental advances of the base rails on the frame rails so that, in the resulting sequential passes of the base plate, a router mounted on the base plate cuts a precision planar surface on the workpiece. A stroke stop assembly fixed to the drive shaft may be used to adjustably limit the rotation of the drive shaft.

Preferably, the linear ratchet assembly has front and rear linear ratchets riding on the upper edge surfaces of the frame rails. A drive shaft spans between and is mounted for rotation on the base rails. Front and rear actuators are connected between their corresponding front and rear linear ratchets and the drive shaft. Each actuator drives its corresponding base rail and linear ratchet. Front and rear variable pressure self-energizing brakes are mounted on corresponding front and rear linear ratchets. Each brake is responsive to increasing force applied to its respective ratchet in a upstream direction to apply a correspondingly higher gripping force to its respective ratchet.

In an automated embodiment, the linear actuator assembly also has a reversable drive motor reciprocating the carriage plate on the shafts and/or linear actuators with reciprocating drives driving their corresponding base rails.

The method for cutting a precision planar surface on a hardwood workpiece includes mounting the common hand router on a carriage plate adapted for cartesian motion above the workpiece in an X-Y plane parallel to the planar surface to be cut. The Z-axis elevation of the cutter head is set to cut the workpiece at the depth of the precision planar surface. A variable pressure self-energizing brake on a linear ratchet upstream of the carriage plate is intermittently tightened to permit simultaneous advancement of the carriage plate downstream from the linear ratchet in equal increments along an X-axis. Each increment is slightly less than a diameter of the cutter of the router. At each increment, the carriage plate is reciprocated back and forth across the workpiece along a Y-axis. The X-axis and each of the Y-axes define a common plane, causing the cutter to cut the workpiece to the depth of the precision planar surface. After each back and forth reciprocation, the brake on the linear ratchet is relaxed to permit advancement of the linear ratchet downstream toward the carriage plate until the precision planar surface is completed.

BRIEF DESCRIPTION OF THE DRAWINGS

Other objects and advantages of the invention will become apparent upon reading the following detailed description and upon reference to the drawings in which:

FIG. 2 is an exploded cross-sectional view with parts broken away taken along the line 2-2 of FIG. 1;

FIG. 3 is an exploded cross-sectional view with parts broken away taken along the line 3-3 of FIG. 1;

FIG. 4 is an exploded elevation view with parts broken away taken along the line 4-4 of FIG. 1;

FIG. 5 is an exploded top plan view with parts broken away of the area 5 of FIG. 1;

FIG. 6 is an exploded cross-sectional downstream view with parts broken away taken on a vertical plane bisecting the carriage base plate of FIG. 1;

FIG. 13 is an exploded top plan view with parts broken away of an automated embodiment of a router sled in accordance with the invention; and FIG. 14 is an exploded front elevation view with parts broken away of the automated embodiment of FIG. 13.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

The Sled

Figure 1:
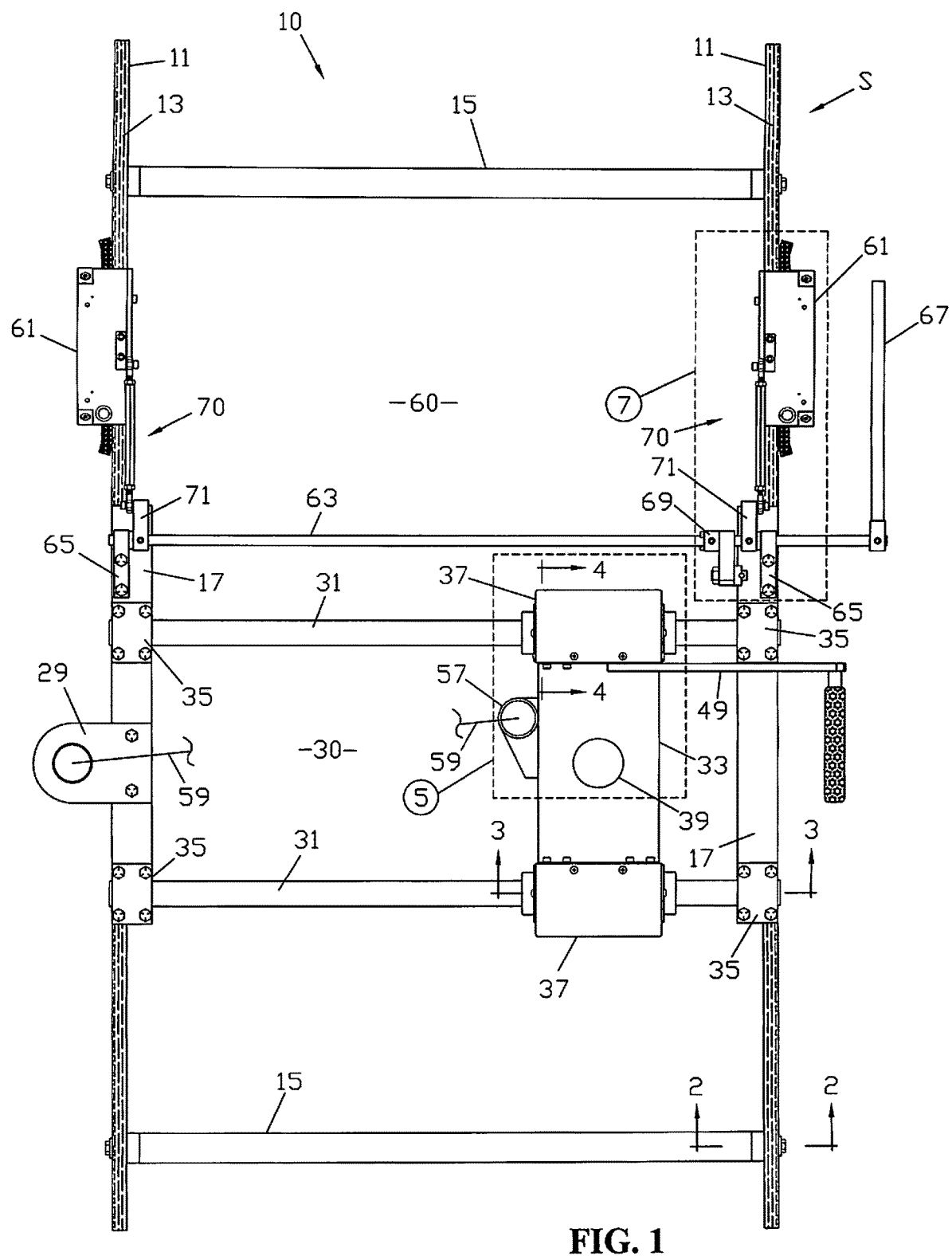
FIG. 1 is a top plan view of a router sled in accordance with the invention.

Turning first to FIG. 1, a sled S provides a sequentially stepped cartesian system to enable a common hand router to create a planar surface on a workpiece. As herein used, the terms "front" and "rear" and "downstream" and "upstream" are to be taken from the point of view of an operator standing in front of the sled S.

The sled S has a support assembly 10 that includes front and rear parallel frame rails 11 with upper edge surfaces 13 defining a common horizontal plane. Transverse cradles 15 space the parallel frame rails 11 at a distance at least wide enough for the cradles 15 to support the workpiece between the frame rails 11. Front and rear parallel base rails 17 slide on the corresponding upper edge surfaces 13 of the frame rails 11.

A carriage assembly 30 has downstream and upstream parallel shafts 31. The shafts 31 span across, are secured at their ends to, and advance in unison in a downstream X-axis direction with, the base rails 17. As best seen in FIG. 6, a horizontal carriage base plate 33 is mounted on the shafts 31 for back-and-forth Y-axis reciprocation above the workpiece W.

A common hand router R mounted on the carriage base plate 33 advances in the X-axis direction in unison with the carriage assembly 30 and reciprocates in Y-axis unison with the carriage base plate 33. The Z-axis elevation of the router cutter C can be varied in relation to the carriage base plate 33 to set the depth of the cut of the router R on the workpiece W.

A linear ratchet assembly 60 is mounted on the frame rails 11 upstream of the carriage assembly 30. The ratchet assembly advances the base rails 17 in equal incremental X-axis distances along the upper edge surfaces 13 of the frame rails 11, sequentially repositioning the router R in the downstream X-axis direction on the frame rails 11. At each sequential position, the carriage 30 is reciprocated along the parallel shafts 31 to guide the router R to plane the portion of the workpiece W in its path. Advancement and reciprocation is repeated until the router R has cut the entire planar surface desired on the workpiece W.

The Support Assembly

Continuing to look at FIG. 1, the frame rails 11 are flat, straight members of any material capable of supporting the sled S with the frame rail upper edge surfaces 13 in a common horizontal plane. The frame rails 11 need not be perfectly straight or parallel. Plywood frame rails 11 are functional, inexpensive, easily produced and afford suitable stability in the direction of importance. Their top edges 13 are easily refurbished and a relatively large contact surface area between the frame rails 11 and the base rails 17 will minimize wear.

The cradles 15 may be arranged orthogonally in relation to the frame rails 11, as is shown, but orthogonality is not a necessity. The cradles 15 may be of any material and cross-sectional configuration capable of supporting the workpiece W with the frame rail upper edge surfaces 13 in the common horizontal plane. The cradles 15 may be rested on top of an existing workbench. They can be used to increase the width available between the frame rails 11 significantly beyond the width of the workbench. Alternatively, an existing workbench may be substituted for the cradles 15 by attaching the frame rails 11 directly to the sides of the work bench.

As best seen in FIG. 2, the ends of the cradles 15 are secured to the frame rails 11 by bolts 19 extending through vertical slots 21 in their corresponding frame rails 11 to brackets 23 mounted against the inside faces of the frame rails 11. The slots 21 provide a variable range of adjustment of the elevation of the brackets 23 on the frame rails 11 in order to accommodate the shape of the workpiece W lying between the cradles 15 and an intended planar surface of the workpiece W.

Returning to FIG. 1, the base rails 17 are straight rigid bars of rectangular cross-section wider than the thickness of the frame rails 11. They are aligned with the outer edges of their corresponding frame rails 11 and overlap the inside edges of the frame rails 11. Two rollers 25 extended below the overlapping portions of each base rail 17 assure that the base rails 17 will properly track their corresponding frame rails 11. The use of the base rails 17 as linear bearings allows some lateral movement to compensate for non-parallelism and non-straightness of the frame rails 11. The base rail rollers 25 can be spaced from their respective frame rails 11 by a distance selected to assure that such compensation is within acceptable limits.

The support assembly also may include a dust collector connection 29, as shown mounted on and extending to the rear of the rear base rail 17.

The Carriage Assembly

Continuing to look at FIG. 1, the downstream and upstream parallel shafts 31 of the carriage assembly 30 are gripped at their ends by four C-shaped clamps 35, two fixed on top of each of the base rails 17. As best seen in FIGS. 3-6, the horizontal base plate 33 is suspended by and extends between two roller assemblies 37, one riding on each shaft 31. As best seen in FIGS. 5-6, an opening 39 centered through the base plate 33 permits the cutter C of a router R to extend below the base plate 33.

Returning to FIG. 1, the roller assemblies 37 are mirrored on a vertical Y-axis plane between the shafts 31. Given this mirrored relationship, the following description of the downstream roller assembly 37 as illustrated in FIGS. 3 and 4 is applicable to both the downstream and upstream roller assemblies 37.

Each roller assembly 37 has a vertical mount 41. The outer portions of the base plate 33 are bolted against the bottoms of the vertical mounts 41. Each vertical mount 41 supports three horizontal rollers 43. Two upper horizontal rollers 43 ride on top of their corresponding shaft 31 and one lower horizontal roller 43 is centered between the upper rollers 43 and is in contact with the bottom of its corresponding shaft 31. Two horizontal mounts 45 extend outwardly from each vertical mount 41. Each horizontal mount 45 supports a vertical roller 47 which maintains contact with the outer walls of its corresponding shaft 31 at its horizontal diametric plane. As shown, the vertical rollers 47 are centered on the same X-axis vertical planes as their corresponding upper horizontal rollers 43. Since both roller assemblies 37 are permanently fixed to and spaced by the base plate 33, their rollers 43 and 47 cooperate to maintain reciprocation of the router R in an accurate Y-axis direction.

As shown, an operating handle 49 is extended upwardly and forwardly from one of the vertical mounts 41 to facilitate reciprocation of the carriage assembly 30 by an operator standing in front of the sled S.

Looking at FIGS. 1 and 3-5, each roller assembly 37 is enclosed by a dust cover 50 secured to its corresponding vertical mount 41. As best seen in FIG. 3, the front and rear walls of a dust cover 50 each have a removable wiper cover 51. The dust covers 50 and wiper covers 51 have openings 53 centered on the longitudinal center axis of their corresponding shaft 31. The wiper covers 51 hold replaceable fiber packings 55 that scrub their corresponding shafts 31 as the carriage assembly 30 reciprocates on the shafts 31. Scrubbing the shafts 31 reduces the likelihood that dust collected on a shaft 31 might enter into the dust cover 50 and impede the smooth operation of the rollers 43 and 47.

The carriage assembly 30 may also have a suction nozzle 57 located to the rear of the base plate 33 to collect shavings cut from the workpiece W by the router R, in which case a flexible dust collector hose 59 will be extended from the nozzle 57 to the dust collector connector 29 mounted on the rear base rail 17.

The Linear Ratchet Assembly

Returning to FIG. 1, the linear ratchet assembly 60 is upstream of the carriage assembly 30 and has front and rear linear ratchets 61 riding on the upper and edge surfaces 13 of the frame rails 11. A drive shaft 63 spans orthogonally across the upstream ends of the base rails 17 and is mounted for rotation atop the base rails 17 by front and rear shaft bearings 65. The drive shaft 63 extends forward of the front shaft bearing 65 to a crank handle 67 operable by an operator standing in front of the sled S. A stroke stop assembly 69 is fixed to the drive shaft 63 to adjustably limit the rotation of the drive shaft 63.

Figure 7:
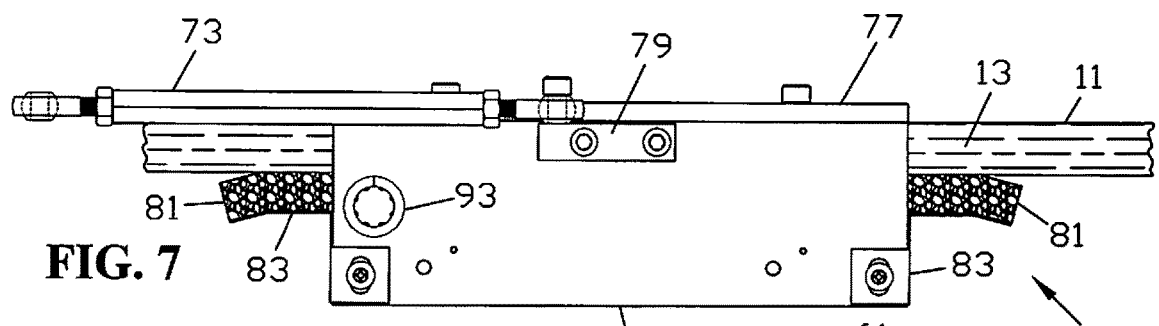
FIG. 7 is an exploded top plan view with parts broken away of the area 7 of FIG. 1.
Figure 8:
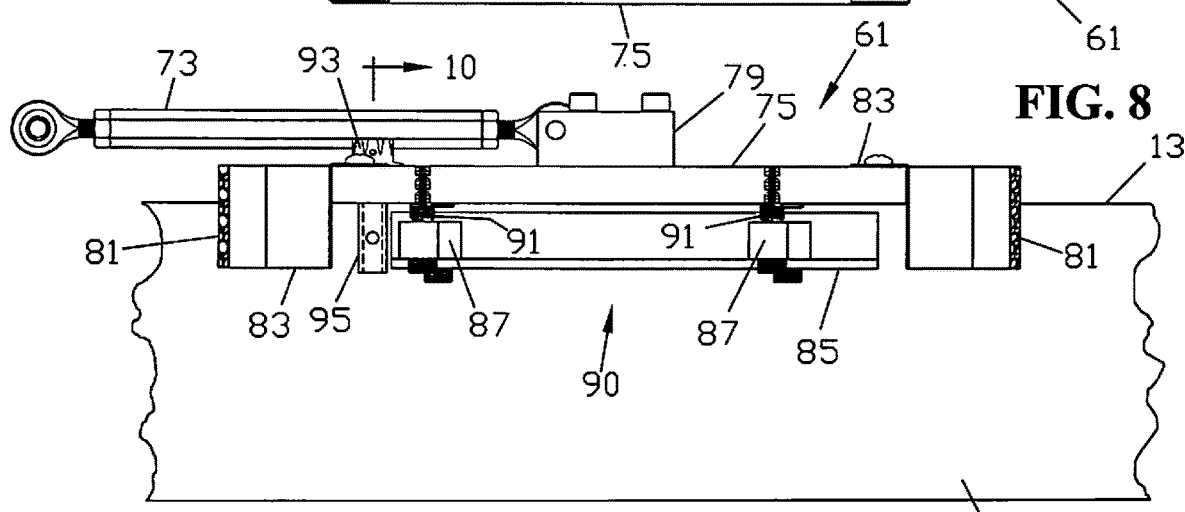
FIG. 8 is an exploded front elevation view with parts broken away of the area 7 of FIG. 1.
Figure 9:
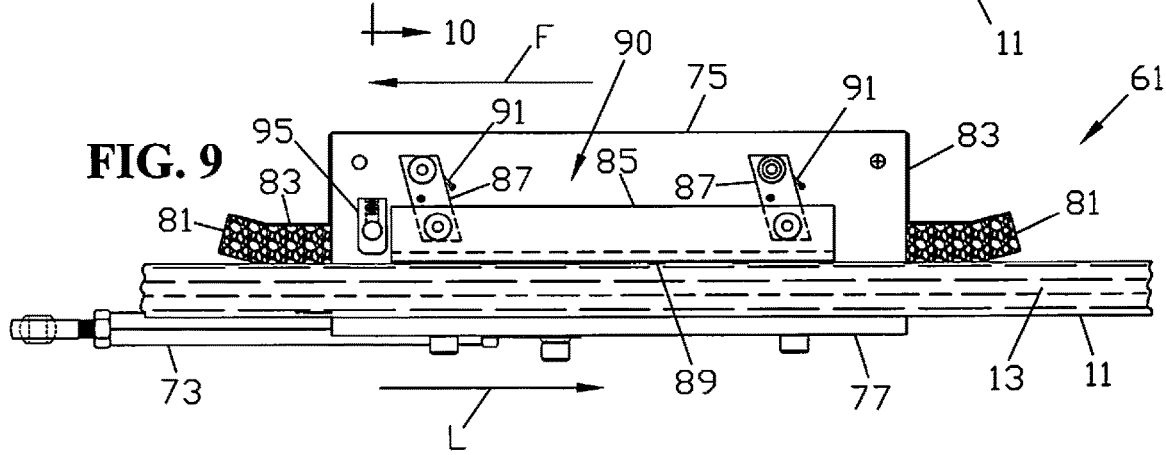
FIG. 9 is an exploded bottom plan view with parts broken away of the area 7 of FIG. 1.

Front and rear actuators 70 are connected between their corresponding linear ratchets 61 and the drive shaft 63. As seen in FIGS. 7-9, each actuator 70 has a crank arm 71 fixed at one end for rotation with the drive shaft 63. The other end of the crank arm 71 is pivotally connected to one end of a crank link 73. The other end of the crank link 73 is pivotally connected to its corresponding linear ratchet 61.

Returning to FIG. 1, the linear ratchets 61 are mirrored on a vertical X-axis plane between the frame rails 11. Given this mirrored relationship, the following description of the front linear ratchet 61 as illustrated in FIGS. 7-10 is applicable to both the front and rear linear ratchets 61.

As seen in FIGS. 7-8, each linear ratchet 61 has a linkage mounting plate 75 and a reaction plate 77 forming an L-shaped bracket. The linkage mounting plate 75 rides on the upper edge surface 13 of its corresponding frame rail 11. The reaction plate 77 is butted against the inside face of the frame rail 11. The downstream end of the crank arm 71 is fixed to the drive shaft 63 as seen in FIG. 1 and the upstream end of the crank link 73 pivots on a link connector 79 fixed atop the linkage mounting plate 75.

As best seen in FIGS. 7-9, each linkage mounting plate 75 has two urethane foam dusters 81 of with sheet-metal backings 83, one extending downstream and the other upstream of their linkage mounting plate 75. The backings 83 are configured to brush the dusters 81 against, and wipe the outer side walls of, their respective frame rails 11. As shown, the distal ends of the backings 83 are bent outwardly from their frame rails 11 to reduce the possibility that a leading edge of a duster 81 might snag against a rail 11. The backings 83 are screwed to the mounting plate at a distance from their frame rail 11 adjustable to assure a firm contact with the rail 11.

Figure 10:
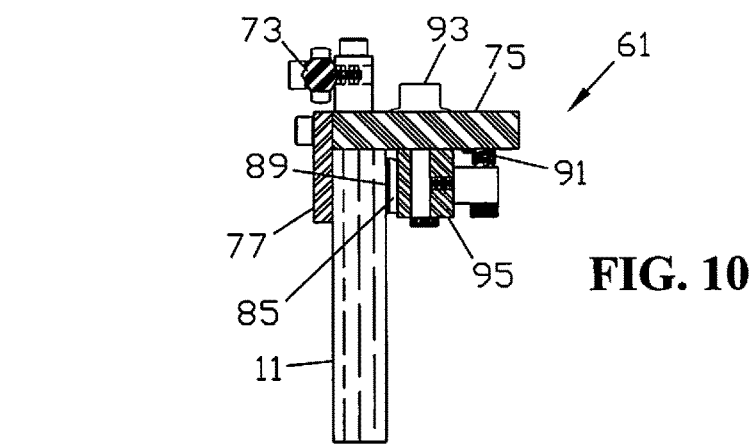
FIG. 10 is an exploded cross-sectional upstream view taken along the line 10-10 of FIG. 8.

As best seen in FIGS. 8-10, front and rear variable pressure self-energizing brakes 90 are mounted on corresponding front and rear linear ratchets 61. As shown, the brakes 90 are mounted on the underside of each linkage mounting plate 75 and have an angle iron 85 with a thin rubber strip 89 adhered to its outer vertical face. The angle iron 85 rocks in horizontal alignment on pivoting links 87 to bring the rubber strip 89 into more tight or relaxed abutment with the outer side walls of its respective frame rail 11 in response to clockwise or counterclockwise rotation of the operating crank handle 67, respectively. Each brake 90 is responsive to increasing force applied to its respective ratchet 61 in an upstream direction to apply a correspondingly higher gripping force to its respective ratchet 61.

For plywood frame rails 11 and rubber strips 89, the links 87 are, in their normal condition shown in FIG. 9, optimally angled approximately 15 from vertical. Angles less than 15° and greater than 20° are unsatisfactory for plywood to rubber contact. Downstream and upstream torsion springs 91 connected between the links 89 and their respective mounting plate 75 bias the angle iron 85 toward its frame rail 11 to reduce the possibility of inadvertent slippage of the linear ratchet 60 on its frame rail 11. For other than plywood to rubber contact, appropriate ranges of angles can be empirically determined. Operation of the sled S is dependent upon the effective bias of the torsion springs 91. The coefficient of friction between the rubber strips 89 and the frame rails 11 is great enough to prohibit movement of the linear ratchets 61 on the frame rails 11 during clockwise rotation of the crank handle 67. Therefore, each clockwise rotation results in a downstream X-axis advancement of the carriage assembly 30 for an incremental distance set by the stroke stop assembly 69.

A release knob 93 on top of the mounting plate 75 rotates a pawl 95 to completely disengage the rubber strip 89 from the frame rail 11 and allow the linear ratchets 61 to be returned toward the upstream end of the sled S.

Operation

Figure 11:
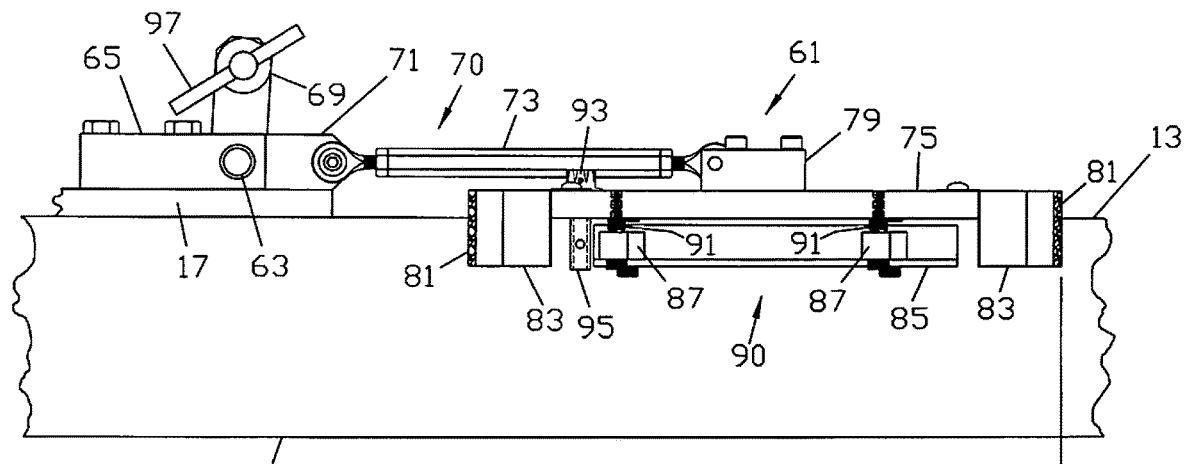
FIG. 11 is an exploded front elevation view with parts broken away of the area 7 of FIG. 1 with the front linear ratchet in a fully extended condition relative to the router.

The operation of the manual embodiment of the sled S illustrated in FIGS. 1-10 begins with several preliminary steps. The workpiece W is rested on the cradles 15 as seen in FIG. 6. The carriage assembly 30 is reciprocated on a Y-axis to position the base plate 33 of the carriage assembly 30 close to one of the frame rails, preferably the rear frame 11. The Z-axis elevation level of the router cutter C is adjusted to cut at the desired plane in the workpiece W. The linear ratchet assembly operating crank handle 67 is rotated in a clockwise condition so that the base plates 17 are fully extend from their ratchet assemblies 61, as is seen in FIG. 11. The position of the linear ratchet assembly 60 on the frame rails 11 is coordinated with the position of the workpiece W to align the cutter C for the most upstream Y-axis cut on the workpiece W. The release knobs 93 are set to a normal condition, allowing the rubber strips 89 of the linear ratchets 61 to engage their respective rails 11, and the router R is activated. As seen in FIG. 11, the projection of the adjustable leg 97 of the stroke stop assembly 69 is set so that, as the assembly 69 is rotated with the drive shaft 63 from the condition of FIG. 11, the leg 97 will not strike the base plate 17 on which the assembly 69 is mounted.

Figure 12:
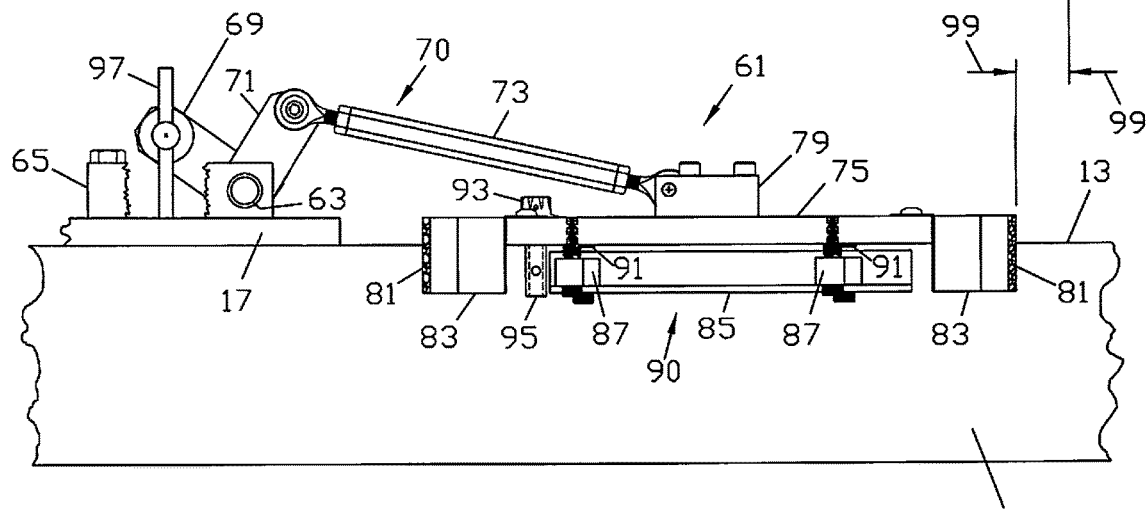
FIG. 12 is an exploded front elevation view with parts broken away of the area 7 of FIG. 1 with the front linear ratchet in a fully advanced condition toward the router.

Looking at FIG. 12, a normal operating cycle of the sled S includes four sequential operator actions. First, the carriage assembly operating handle 49 is pulled, causing the router R to execute a forward primary cut on a first Y-axis across the workpiece W. Second, the carriage assembly operating handle 49 is pushed, causing the router R to execute a rearward finishing cut on the same Y-axis across the workpiece W. Third, the linear ratchet assembly operating crank handle 67 is rotated counterclockwise, incrementally advancing the X-axis position of the linear ratchets 61 on their frame rails 11 toward their respective stationary base rails 17, thus collapsing the actuators 70 to the condition seen in FIG. 12. Fourth, the linear ratchet assembly operating crank handle 67 is rotated clockwise, expanding the actuators 70 to again fully extend their base rails 17 away from their stationary linear ratchets 61 to the next reciprocal-cut Y-axis.

During the third step, the brake 90 is relaxed to permit advancement of the linear ratchets 61 on their frame rails 11 toward their respective stationary base rails 17. During the fourth step, the brake 90 is tightened to prevent the linear ratchets 61 from slipping on their frame rails 11 as the base rails 17 are advanced on the frame rails 11.

One other step may be added to the first normal operating cycle. Counterclockwise rotation of the linear ratchet assembly operating crank handle 67 is stopped when the linear ratchets 61 have advanced for a downstream distance 99 approximately ¹⁄₁₆" less than the diameter of the cutter C, as seen by comparison of FIGS. 11 and 12. At this juncture, the adjustable leg 97 of the stroke stop assembly 69 is extended into contact with its base plate 17 and secured in that position as seen in FIG. 12, thereby presetting subsequent incremental downstream advances of the base rails 17.

Subsequent operating cycles are identical to the initial operating cycle explained above, except that the adjustment of the leg 97 of the stroke stop assembly 69 need not be repeated. The repetition of subsequent operating cycles will continue until the desired planar surface has been cut in the workpiece W.

After execution of the final cut to produce the precision planar surface on the workpiece W, the release knobs 93 and associated pawls 95 can be rotated to completely release the brakes 90 on the linear ratchets 61 from their respective frame rails 11. In this condition, external upstream force applied to the linear ratchet assembly 60 will pull the linear ratchet assembly 60 upstream, dragging the carriage assembly 30 with it, in preparation for planing another workpiece W.

The preferred starting position of the carriage base plate 33 and router R close to the rear frame rail 11 has the advantage of using a pulling stroke for the deep forward primary cuts and a pushing stroke for the shallow rearward finishing cuts. Alternatively, the operating cycles of the sled S could begin with the carriage base plate 33 and router R close to the front frame rail 11 so that the carriage assembly operating handle 49 can be pushed to execute rearward Y-axis primary cuts across the workpiece W and then pulled to reciprocate on the same Y-axis and execute forward finishing cuts across the workpiece W. However, this alternative loses the deep-cut pull advantage and could not be used with the dust nozzle 57 in place.

The operation of the sled S would be degraded if the linear ratchets 61 were to slip on the frame rails 11 during downstream motion of the base rails 17. A suitable range of coefficients of friction between the surfaces of 11 and 17 is empirically determinable. A 0.3 coefficient of friction is functional. Plywood frame rails 11 and aluminum base rails 17 provide a satisfactory coefficient of friction.

Automated Sled

Turning to FIGS. 13-14, an automated embodiment of the sled S is generally the same as the manual embodiment of FIGS. 1-10. Like elements are identified by the same element numbers used in FIGS. 1-10.

The automated embodiment modifications of the sled S include a reversible motor 140 driving the front end of a driving a screw shaft 141 that extends through a nut 143 fixed on the carriage base plate 33 to a screw mount 145 fixed on the rear base plate 17 so that reversing operation of the motor 140 reverses reciprocation of the carriage base plate 33 in Y-axis directions.

The automated embodiment modifications also include a linear actuator 170 for each linear ratchet 61. Each linear actuator 170 has a reciprocating drive 180 with a reciprocating shaft 181 extending from the drive 180 to the link connector 79 on the linkage mounting plate 75 of its respective linear ratchet 61. A non-reciprocating shaft 183 extends to a base rail connector 185 mounted on its respective base rail 17.

Provision of controls and settings enabling the reversible motor 140 and the reciprocating drives 180 of the linear actuators 170 to fully automate the operation described with respect to the manual embodiment of FIGS. 1-10 are within the scope of those of ordinary skill in the art.

In a functional prototype used to plane a 2½" thick hardwood workpiece W, two parallel 10' long frame rails 11 of 12" by ¾" birch veneer plywood were spaced at a distance of 50" by cradles 19 made with straight lengths of 14" square steel tubing.

The rubber strips 89 of the linear ratchets 61 were 1/32" thick 60 shore A neoprene. A 1/8" gap between the plywood rails 11 and the base rail rollers 25 was sufficient to compensate for any non-parallelism and non-straightness of the frame rails 11.

Should wood fibers dislodge from the surfaces of the plywood frame rails 11 and collect on the rubber contact strips 89, the coefficient of friction might be sufficiently altered as to increase the likelihood of slippage. Therefore, natural shellac was applied onto the contact portions of the frame rails 11 to reduce the likelihood of wood fibers dislodging. Shellac is preferred because it hardens only by solvent evaporation and does not polymerize in the air. Polymerizing finishes tend to cross-link with the rubber and cause a bond resulting in a malfunction of the linear ratchet.

Thus, it is apparent that there is been provided, in accordance with the invention, a router sled that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A sled for guiding a router to cut a precision planar surface on a hardwood workpiece, the sled comprising:
   two substantially parallel frame rails having upper edge surfaces defining a common horizontal plane;
   two cradles spacing said frame rails at a distance suitable to support the workpiece on said cradles and between said frame rails;
   two substantially parallel base rails, each adapted to slide on a corresponding said upper edge surface of said frame rails;
   two parallel shafts orthogonally spanning between said base rails;
   a carriage plate adapted to be reciprocated on said shafts and above the workpiece; and
   a linear ratchet assembly upstream of said base rails adapted to drive said base rails downstream at intervals along said frame rails, said linear ratchet assembly comprising:
      front and rear linear ratchets riding on said upper edge surfaces of said frame rails;
      a drive shaft spanning between and mounted for rotation on said base rails;
      front and rear actuators connected between corresponding said front and rear linear ratchets and said drive shaft; and
      front and rear variable pressure self-energizing brakes mounted on corresponding said front and rear linear ratchets, each said brake responsive to increasing force applied to its respective said ratchet in an upstream direction to apply a correspondingly higher gripping force to its respective said ratchet;
   whereby a router mounted on said carriage may be sequentially incrementally repositioned to reciprocate across the workpiece during each of said intervals.

2. A sled according to claim 1 further comprising a stroke stop assembly fixed to the drive shaft to adjustably limit the rotation of the drive shaft.

3. A sled according to claim 1 further comprising a reversable drive motor reciprocating said carriage plate on said shafts.

4. A sled according to claim 1, said linear actuator assembly comprising linear actuators with reciprocating drives, each said actuator driving a corresponding one of said base rails.

5. A sled according to claim 1, said linear actuator assembly comprising linear actuators with reciprocating drives, each said actuator driving a corresponding one of said linear ratchets.

6. A sled according to claim 1, said frame rails being plywood.

7. A sled for guiding a router to cut a precision planar surface on a hardwood workpiece, the sled comprising:
   two frame rails having upper edge surfaces in a common horizontal plane;
   two cradles supporting the workpiece between said frame rails;
   two substantially parallel base rails adapted to slide on corresponding said upper edge surfaces of said frame rails;
   two parallel shafts orthogonally spanning between said base rails;
   a carriage plate adapted to be reciprocated on said shafts and above the workpiece; and
   a linear ratchet assembly adapted to drive said base rails downstream at intervals along said frame rails, said linear ratchet assembly comprising:
      front and rear linear ratchets riding on said upper edge surfaces of said frame rails;
      a drive shaft spanning between and mounted for rotation on said base rails;
      front and rear actuators connected between corresponding said front and rear linear ratchets and said drive shaft; and
      front and rear variable pressure self-energizing brakes mounted on corresponding said front and rear linear ratchets, each said brake responsive to increasing force applied to its respective said ratchet in an upstream direction to apply a correspondingly higher gripping force to its respective said ratchet;
   whereby a router mounted on said carriage plate may be sequentially incrementally repositioned to reciprocate across the workpiece during each of said intervals.

* * * * *